July 13, 1926.
L. P. KELLY
FEEDING DEVICE FOR BIRDS
Filed Jan. 26, 1924
1,592,492
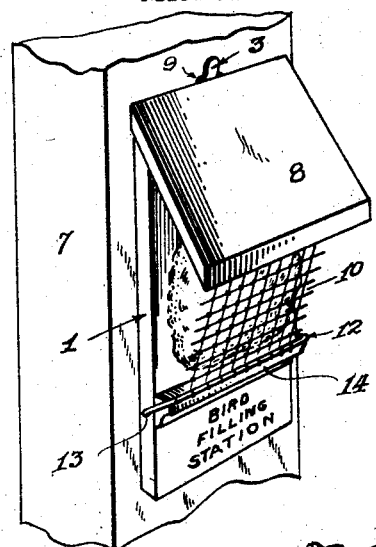
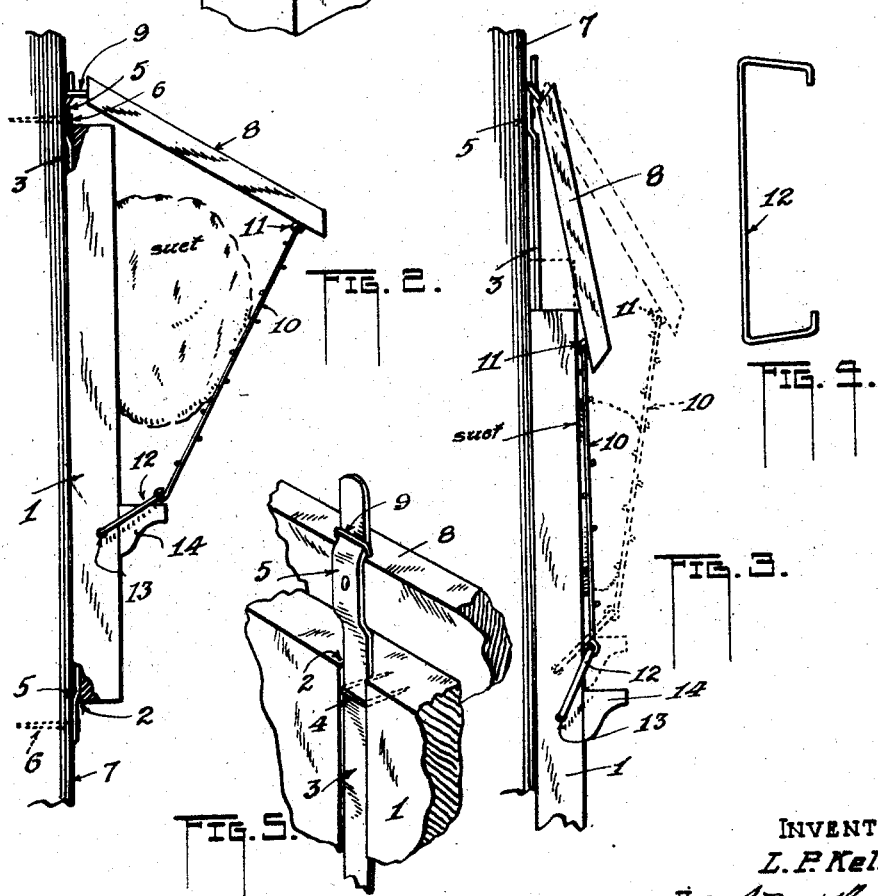
INVENTOR-
L. P. Kelly.
By
ATT'Y.

Patented July 13, 1926.

1,592,492

UNITED STATES PATENT OFFICE.

LEWIS P. KELLY, OF PEORIA, ILLINOIS.

FEEDING DEVICE FOR BIRDS.

Application filed January 26, 1924. Serial No. 688,859.

This invention relates to feeding devices. It pertains more particularly to a device for holding suet and like materials for feeding birds during the winter season.

An object of the invention is that of providing a device of the nature described in which the feeding material will be firmly held in feeding position so as to be readily reached by the birds and from which it cannot be removed by birds of the thieving kind.

Another object, and an important one, is to furnish a device including a foraminous material for snugly and firmly holding suet or other similar type of feeding material and so devised that birds may cling to and feed through said foraminous material, and that the latter will follow the said feeding material as it is consumed, permitting the birds to always reach the food thus provided.

Still another object is to so construct a device of this nature that a weighted grating or netting serving to confine the feeding material will be caused to follow the surface of the constantly receding material, as consumed, so that birds feeding through such grating or netting can reach every portion of such material until all is removed.

To the end that the invention may be readily understood, the accompanying drawings are provided showing two of the forms of the invention, though other forms having the same objects in view may be readily devised.

Figure 1 shows one of the form of the invention in perspective.

Figure 2 is a side elevation of the same in one of its positions in holding the feeding material.

Figure 3 is also a side elevation of the same form showing another of the positions of the parts thereof.

Figure 4 is a plan of a bail used with the device of my invention shown in the figures just described.

Figure 5 shows in perspective the relation of certain parts entering into the device of the preceding figures.

It is customary, especially in the winter feeding of birds, to tie pieces of fat or suet to trees and other kinds of supports from which birds of certain kinds readily feed, but it is often necessary, in order to be enabled to reach the material, to rest upon it. An insecure footing is afforded, however, and some birds seem to avoid clinging to the fatty substance.

The devices herein to be described, or equivalents thereof, have been provided for holding the material in a firm manner and does not require the birds to cling to it and yet it may be readily fed from and can always be reached in any stage of its consumption, in addition to which it cannot be removed by large birds such as the jay-bird.

I am aware that a wire basket has been used for holding suet but when the material has been partly consumed it becomes more and more difficult to reach it through the meshes of said basket. It is my purpose, therefore, to so provide a device that the birds can freely reach the suet at all times as stated.

In the first five figures is a board 1 which preferably has a groove 2 in its rear side extending longitudinally thereof to receive a metal ribbon 3 constructed, for example, as shown. That is to say, said ribbon is straight throughout the greater portion of its length and lies in said groove 2, being retained therein by staples driven into the board, but one of which is shown, clearly, in Figure 5, these permitting the ribbon and board to have free movement relatively. The extremities of the ribbon are bent out of plane of the latter as at 5 and are adapted to be secured to a support 7 by nails or screws 6, for example, the board being permitted, therefore, to have free vertical movement on said ribbon.

A protecting roof portion is preferably provided which consist of a board 8 having a metal loop 9, such as a screw-eye, secured in one of its edges to engage over the upper end of the ribbon 3, Figure 5, while near the opposite edge, on its under surface, there is hingedly attached a section of wire netting such as what is known as "hardware cloth" whose meshes are preferably about one-half inch in size so as to afford easy access of the bird's bill. Said netting may be held upon said board 8 by screw-eyes 11, for example, while the wires of the opposite edge of the netting are looped loosely about a bail 12, Figure 4, whose ends are freely engaged in holes or sockets 13 therefor in opposite edges of the board 1 at about one-third of the distance from the lower edge of the same, 14 being a convenient ledge or stop to limit the downward movement of the bail and the netting attached to it.

When set up for use the board 1 is attached to any support by the ribbon 3 in the manner described, then upon placing the suet or other material between the board and the netting 10 the eye 9 of said board 8 is hooked over the upper end of said ribbon as shown. Upon releasing the parts the board 1, acting by gravity, descends upon the ribbon causing the board 8 and said netting to straighten out or tend to come in line with one another thus clamping the suet firmly, the netting being made to move toward said board 1, providing the clamping action. Now, as the material is fed from its thickness is gradually reduced and the board 1 constantly acting by the force of gravity, causes the netting to "follow in" upon the material, one of the consequent positions being indicated in broken lines in Figure 3, until even when but a thin portion of the said material is left, as shown in continuous lines in that figure, it will still be subjected to the clamping action described, until all is consumed. It is thus seen that the birds, while given a secure foot-hold by means of the netting, are at all times able to reach even the smallest particle of the food.

While I may resort to the force of gravity in the operation of the feeding device it is to be understood that it is not my intention to be confined to this method of bringing about the automatic closing of the parts upon the feeding material by stored energy. It is clear that the board 1 of the type of device shown herein need not be of the full length illustrated but may be terminated lower down and the feeding material may be enclosed between the netting 10 and the support 7. But the form shown and described is perhaps preferable as presenting a neater and more finished appearance.

The device is readily collapsible so as to lie in a compact flat form for shipment.

I claim:

1. In a feeding device for birds, the combination of a suspended weighted part adapted to be moved by the force of gravity, a two-section second part opposite the first and supported hingedly at one edge independently thereof and attached at its opposite edge to said weighted part, the two parts adapted for clamping between them a feeding material and also adapted to maintain a constant pressure on said material due to said weight.

2. The combination with a support, of a guide affixed thereto in an upright position, a part slidably engaging the same, a second part of netting disposed opposite the first, a link hingedly connecting the lower end of the second part with the first, and a member hinged at one end to the upper end of said second part and hingedly supported at its other end at the support above the first named part.

3. The combination with a support, of a guide affixed thereto in an upright position, a part slidably engaging the same, a second part of netting disposed opposite the first, a link hingedly connecting the lower end of the second part with the first, means to limit the movement of the said link in one direction, and a member hinged at one end to the upper end of the said second part and hingedly supported at its other end at the support above the first named part.

4. In a feeding device for birds, the combination with a support, a guide mounted thereon in a vertical position, a part slidable upon and connected with such guide, a second part of wire netting disposed opposite the first and hingedly attached at its lower edge thereto, the parts adapted to hold between them a feeding material, and a member hinged at one end to the upper edge of the second part and at its other end to the support above the first named part, the said second part in the lowest position of the first part adapted to lie substantially flat upon the latter and in the raised position of said first part to lie at an angle thereto.

5. In combination with a support, a part adapted for bodily shifting movement vertically relatively to the support, means to mount the part on the support adapted to permit such vertical movement, a part of foraminous material hingedly attached to one edge to the first named part, and a member hingedly attached to an opposite edge of the second described part above the place of connection of the two said parts and itself hingedly suspended above the said parts, the place of said connection of the said two parts being shiftable with respect to the point of suspension of the said member.

6. In combination with a support, a guide secured thereto and spaced therefrom, a part engageable with the guide adapted to move in a vertical plane, a second part having a hinged connection at its lower edge to the first named part and adapted to swing away therefrom, and a member above the said second part hingedly connected at one edge to the upper edge of the same, and means to pivotally support the member above the said first part.

7. In combination with a support, a guide secured thereto and spaced therefrom, a part engageable with the guide adapted to move in a vertical plane, a second part having a hinged connection at its lower edge to the first named part and adapted to swing away therefrom, a member above the said second part hingedly connected at one edge to the upper edge of the same, means to pivotally support the member above the said first part, and a stop carried by the said first part adapted to limit the extent of movement of the said second part with respect thereto.

In testimony whereof I affix my signature.

LEWIS P. KELLY.